United States Patent
Schuster et al.

(10) Patent No.: US 12,010,117 B1
(45) Date of Patent: *Jun. 11, 2024

(54) METHODS AND SYSTEMS FOR AUTHENTICATION OF NEW USERS

(71) Applicant: United Services Automobile Association (USAA), San Antonio, TX (US)

(72) Inventors: Corinne Schuster, San Antonio, TX (US); Gabriel Carlos Fernandez, San Antonio, TX (US); Ameer A. Noorani, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 354 days.

This patent is subject to a terminal disclaimer.

(21) Appl. No.: 17/396,204

(22) Filed: Aug. 6, 2021

Related U.S. Application Data

(63) Continuation of application No. 15/983,711, filed on May 18, 2018, now Pat. No. 11,122,038.

(60) Provisional application No. 62/508,258, filed on May 18, 2017.

(51) Int. Cl.
*H04L 9/40* (2022.01)
*G06F 16/9535* (2019.01)

(52) U.S. Cl.
CPC ...... *H04L 63/0876* (2013.01); *G06F 16/9535* (2019.01)

(58) Field of Classification Search
CPC .......................... H04L 63/0876; G06F 16/9535
See application file for complete search history.

(56) References Cited

U.S. PATENT DOCUMENTS

| | | | |
|---|---|---|---|
| 7,886,334 B1* | 2/2011 | Walsh | H04L 67/14 726/1 |
| 11,386,129 B2* | 7/2022 | Chrapko | G06F 16/29 |
| 11,436,417 B2* | 9/2022 | Badr | G06F 16/9537 |
| 11,455,418 B2* | 9/2022 | Feuz | G06F 16/90332 |
| 11,555,072 B2* | 1/2023 | Wu | C07K 16/2803 |
| 11,615,446 B2* | 3/2023 | Bundi | G06Q 30/00 705/14.73 |
| 11,640,569 B2* | 5/2023 | Chrapko | G06Q 50/01 706/12 |
| 2003/0182421 A1* | 9/2003 | Faybishenko | H04L 67/1042 709/224 |
| 2009/0325598 A1* | 12/2009 | Guigne | G01S 5/021 455/456.1 |
| 2015/0058950 A1* | 2/2015 | Miu | G06F 21/31 726/7 |
| 2015/0128240 A1* | 5/2015 | Richards | H04W 12/068 726/7 |

(Continued)

OTHER PUBLICATIONS

US 11,704,436 B2, 07/2023, Feuz (withdrawn)*

*Primary Examiner* — Yonas A Bayou
(74) *Attorney, Agent, or Firm* — Fletcher Yoder, P.C.

(57) ABSTRACT

Embodiments disclosed herein may relate to systems and methods for secure authentication that enable a user to set up an account or log in an existing account upon an existing user vouching for the user. Embodiments disclosed herein relate to verifying one or more attributes of the user by transmitting multiple decentralized verification notifications to multiple existing users. Upon receiving a verification quorum, a request may be authenticated.

20 Claims, 6 Drawing Sheets

(56) References Cited

U.S. PATENT DOCUMENTS

2018/0121907 A1* 5/2018 Chisholm ............. G06Q 20/40

* cited by examiner

Add Family Member

Company A would like to save you steps in this process:

- Please provide the details to add your family member.
- Click "Next" and we will search our records for a possible match.
- If a match is not found, continue to provide information to add your family member to your personal profile.

Eligibility for Company A membership is subject to verification. Any date of birth, occupation and military information you provide will be shared with each of the Company A companies. We will use it to properly identify you and for other Company A business purposes.

Personal Information

Family Member's Relationship to You: [Cohabitant ∨]

If you do not see the appropriate relationship, call 1-800-531-Company A (8722).

Personal Details for Cohabitant

Search to see if the person you are adding has ever been a Company A member.

Do you know the Company A number of the person you are adding? ◯ Yes  ◯ No

[Cancel] [Next]

Add Family Member ⊠

Company A would like to save you steps in this process:

- Please provide the details to add your family member.
- Click "Next" and we will search our records for a possible match.
- If a match is not found, continue to provide information to add your family member to your personal profile.

Eligibility for Company A membership is subject to verification. Any date of birth, occupation and military information you provide will be shared with each of the Company A companies. We will use it to properly identify you and for other Company A business purposes.

Personal Information

Family Member's Relationship to You | Cohabitant ∨

If you do not see the appropriate relationship, call 1-800-531-Company A (8722)

Personal Details for Cohabitant

Search to see if the person you are adding has ever been a Company A member.

Do you know the Company A number of the person you are adding? ● Yes ○ No

| Company A Number | [    ] |
| First Name | [        ] |
| Middle Name | [          ] (OPTIONAL) |
| Last Name | [          ] |
| Suffix | [ v ] (OPTIONAL) |
| Date of Birth | [     ] MM/DD/YYYY |
| Gender | ○ Male   ○ Female |
| Marital Status | [     v ] |

FIG. 2B
(Continued)

METHODS AND SYSTEMS FOR AUTHENTICATION OF NEW USERS

CROSS REFERENCE TO RELATED APPLICATIONS

This application is a continuation of U.S. Non-Provisional patent application Ser. No. 15/983,711, filed May 18, 2018, which claims priority to U.S. Provisional Patent Application Ser. No. 62/508,258, filed May 18, 2017, each of which is hereby incorporated by reference in its entirety.

TECHNICAL FIELD

This application related to the field of secure network authentication systems.

BACKGROUND

Closed-loop authentication refers to a mechanism whereby one or more users must verify the purported identity of a new user before the new user is authenticated for access a company's databases and/or networks. Conventionally, the company verifies the new user's identity is when the new user uploads (or otherwise provides) a verification document (e.g., picture ID or some other supporting documents proving eligibility of the user to have the account). A system administrator may then contact one or more existing users to verify the new user's credentials. For some companies, new users are required to be physically present so that the administrator can ensure the new user's identity in person. Although this type of authentication process may be effective, this process may be problematic if the company does not have a physical location that is convenient for the user to visit.

As the processing power of computers allow for greater computer functionality and the Internet technology era allows for interconnectivity between computing systems, users have developed an expectation that authentication can be entirely conducted online and without any human intervention. As a result, many existing network solutions authenticate new users by requiring the new users to provide answers to personal questions, for which the answers are only apparent to the new users. Non-limiting examples of these questions may include date and place of birth, social security number, or address of the new user. The answers are then subsequently verified when the new user sends identifying information.

The above-mentioned method suffers from three problems. First, the authentication process still requires subsequent correspondence with new users and still involves human interactions, which may lead to human inaccuracies and errors. Second, the authentication process is a timely and tedious process. And third, as identity theft has become more prevalent in recent years, the answers to the identification questions may be easily stolen or illegally obtainable by a fraudster. As a result, a new account may be created using a stolen identity or by correct answers obtained using improper methods (e.g., security breaches and/or cyber-attacks). This unlawful use of user's identity may lead to financial and other losses for the companies.

SUMMARY

For the aforementioned reasons, there is a need in the art for a timely and secure method to authenticate new users and to verify their identity in a reliable manner. The systems and methods disclosed herein are intended to address the shortcomings in the art mentioned above and provide additional or alternative benefits as well. More specifically, the systems and methods described herein enable a new user to set up an account with a company upon a registered user of the company vouching the new user to enable authentication of the new user prior to setting up of the account of the new user with the company.

In an embodiment, a decentralized authentication method comprises upon displaying a graphical user interface comprising one or more input fields, receiving, by a server from a computing device, an authentication request to access a network, the authentication request comprising at least an attribute associated with a new user operating the computing device, wherein the attribute is inputted by the new user via the one or more input field within the graphical user interface; querying, by the server, a database to identify a plurality of existing users and their respective user devices, wherein the database is configured to store one or more attributes of a set of existing users, wherein each existing user within the set of existing users is an authenticated existing user with access to the network, wherein the plurality of existing users is a subset of the set of existing users; wherein each existing user within the plurality of existing users shares at least one attribute received via the authentication request, and wherein a reputation score corresponding to each existing user within the plurality of existing users satisfies a reputation score threshold; transmitting, by the server, a verification message to each user device of each existing user within the plurality of existing users; in response to transmitting the verification messages, receiving, by the server, a plurality of responses from the plurality of existing user devices operated by the plurality of existing users, each response indicating whether each existing user verifies the attributes inputted by the new user; when a number of responses verifying the attribute inputted by the new user satisfies a threshold, authenticating, by the server, new user by granting the computing device accesses to the network.

In another embodiment, a computer system for decentralized authentication, the computer system comprises a computing device operated by a new user, wherein the new user is not an authenticated user; a set of user devices operated by a set of existing users, wherein each existing user within the set of existing users is an authenticated existing user with access to a network; a server communicatively coupled with the computing device and the set of user devices, the server configured to upon displaying a graphical user interface comprising one or more input fields, receive, from the computing device, an authentication request to access the network, the authentication request comprising at least an attribute associated with the new user operating the computing device, wherein the attribute is inputted by the new user via the one or more input field within the graphical user interface; query a database to identify a plurality of existing users and their respective user devices, wherein the database is configured to store one or more attributes of the set of existing users, wherein the plurality of existing users is a subset of the set of existing users; wherein each existing user within the plurality of existing users shares at least one attribute with the new user, and wherein a reputation score corresponding to each existing user within the plurality of existing users satisfies a reputation score threshold; transmit a verification message to each user device of each existing user within the plurality of existing users; in response to transmitting the verification messages, receive a plurality of responses from the plurality of existing user devices operated by the plurality of existing users, each response indicating whether each existing user verifies the attributes inputted by the new user; when a number of responses verifying the attribute inputted by the new user satisfies a threshold, authenticate the new user by granting the computing device accesses to the network.

In another embodiment, a computer system of a company may receive a request from a user to set up an account with the company. The request may include information about a person having a personal and/or social relationship with the new user where the person is a registered user of the company. The computer system may verify with various internal platforms that an account exists for the registered user cited in the request with the company. If an account exists, the computer system generates a reputation score for the registered user based on one or more data features associated with the registered user. The computer system may also determine a type and length of the relationship between the new user and the registered user based on various internal and external personal, financial, and social data sources. The computer system may then determine whether the registered user is eligible to vouch for the new user based on the reputation score of the vouching user and/or type and length of the relationship between the user and the registered user. If the register user is eligible to vouch for the new user, the computer system may transmit a request to the registered user to confirm the identity of the user and relationship with the new user. Upon receiving the confirmation from the registered user, the computer system may generate the account of the new user.

In another embodiment, the computer system of the company may use a decentralized communication method to verify one or more attributes associated with the new user. For instance, the computer system may identify one or more existing users who may be eligible to verify the identity of the new user, contact them in a decentralized manner, and upon receiving a positive responses from a pre-determined quorum of the existing users that satisfies a pre-determined threshold, authenticate the new user.

In another embodiment, a server-implemented method comprises generating, by a server, a reputation score for each user associated to a client company based on one or more data features corresponding to the each user. The server-implemented method further comprises storing, by the server, the reputation score for each user in a non-transitory machine-readable storage database configured to store a plurality of reputation scores associated with a plurality of users. The server-implemented method further comprises receiving, by the server, a request from a user using an user device signing up for a service where the request at least comprises a relationship with at least one account from a plurality of accounts with the service corresponding to the plurality of users. The server-implemented method further comprises determining, by the server, a reputation score corresponding to a user associated to the at least one account and comparing with a pre-defined threshold value applicable to the user. The server-implemented method further comprises, upon the server determining that the reputation score corresponding to the user is greater than a pre-defined threshold value, determining, by the server, a logical address and a physical address of the user device of the user and a client device of the user based on one or more communication messages between the server with the user device and the client device. The server-implemented method further comprises, upon the server determining that the logical address of the user device and client device are different to each other and a distance between the physical address of the user device and the client device is greater than a pre-defined threshold value, transmitting, by the server, to a client device of the user, a graphical user interface configured to display on the client device data corresponding to at least an identity of the user. The server-implemented method further comprises receiving, by the server, from the client device of the user, a message authenticating the user based at least in part on a confirmation of the identity of the user.

In another embodiment, a computer system comprises a server, which is configured to generate a reputation score for each user associated to a client company based on one or more data features corresponding to the each user. The server is further configured to store the reputation score for each user in the database configured to store a plurality of reputation scores associated with a plurality of users. The server is further configured to receive a request from a user using a user device signing up for a service, wherein the request at least comprises a relationship with at least one account from a plurality of accounts with the service corresponding to the plurality of users. The server is further configured to determine a reputation score corresponding to a user associated to the at least one account and comparing with a pre-defined threshold value applicable to the user. The server is further configured to, upon the server determining that the reputation score corresponding to the user is greater than a pre-defined threshold value, determine a logical address and a physical address of the user device of the user and a client device of the user based on one or more communication messages between the server with the user device and the client device. The server is further configured to, upon the server determining that the logical address of the user device and client device are different to each other and a distance between the physical address of the user device and the client device is greater than a pre-defined threshold value, transmit to a client device of the user, a graphical user interface configured to display on the client device data corresponding to at least an identity of the user. The server is further configured to receive from the client device of the user, a message authenticating the user based at least in part on a confirmation of the identity of the user.

In another embodiment, a server-implemented method comprises generating, by a server, a reputation score for each user associated to a client company based on one or more data features corresponding to the each user. The server-implemented method further comprises storing, by the server, the reputation score for each user in a non-transitory machine-readable storage database configured to store a plurality of reputation scores associated with a plurality of users. The server-implemented method further comprises receiving, by the server, a request from a user using an user device signing up for a service where the request at least comprises a relationship with at least one account from a plurality of accounts with the service corresponding to the plurality of users. The server-implemented method further comprises determining, by the server, a reputation score corresponding to a user associated to the at least one account and comparing with a pre-defined threshold value applicable to the user. The server-implemented method further comprises, upon the server determining that the reputation score corresponding to the user is greater than a pre-defined threshold value, determining, by the computer, a relationship between the user and the user based on data records corresponding to the user and the user based on social media data of the user and the user. The server-implemented method further comprises transmitting, by the server, to a client device of the user, a graphical user interface configured to display on the client device data corresponding to at least an identity of the user. The server-implemented method further comprises receiving, by the server, from the client device of the user, a message authenticating the user based at least in part on a confirmation of the identity of the user.

Even though some aspects of the methods and systems are described embodiments involving a new user being authenticated into a closed-loop network, the methods and system described herein may also be used to authenticate an existing user who has lost his/her authentication credentials. Furthermore, the methods and systems described herein may be used to authenticate new and/or existing users for companies that do not utilize a closed-loop network or closed-loop authentication methods because the systems and methods disclosed herein applies to all electronic authentication.

It is to be understood that both the foregoing general description and the following detailed description are exemplary and explanatory and are intended to provide further explanation of the invention as claimed.

BRIEF DESCRIPTION OF DRAWINGS

The accompanying drawings constitute a part of this specification and illustrate embodiments of the invention. The present disclosure can be better understood by referring to the following figures. The components in the figures are not necessarily to scale, emphasis instead being placed upon illustrating the principles of the disclosure.

FIG. 2A shows a graphical user interface showing a webpage, according to an embodiment.

FIG. 2B shows a graphical user interface showing a webpage, according to an embodiment.

DETAILED DESCRIPTION

Figure 1:
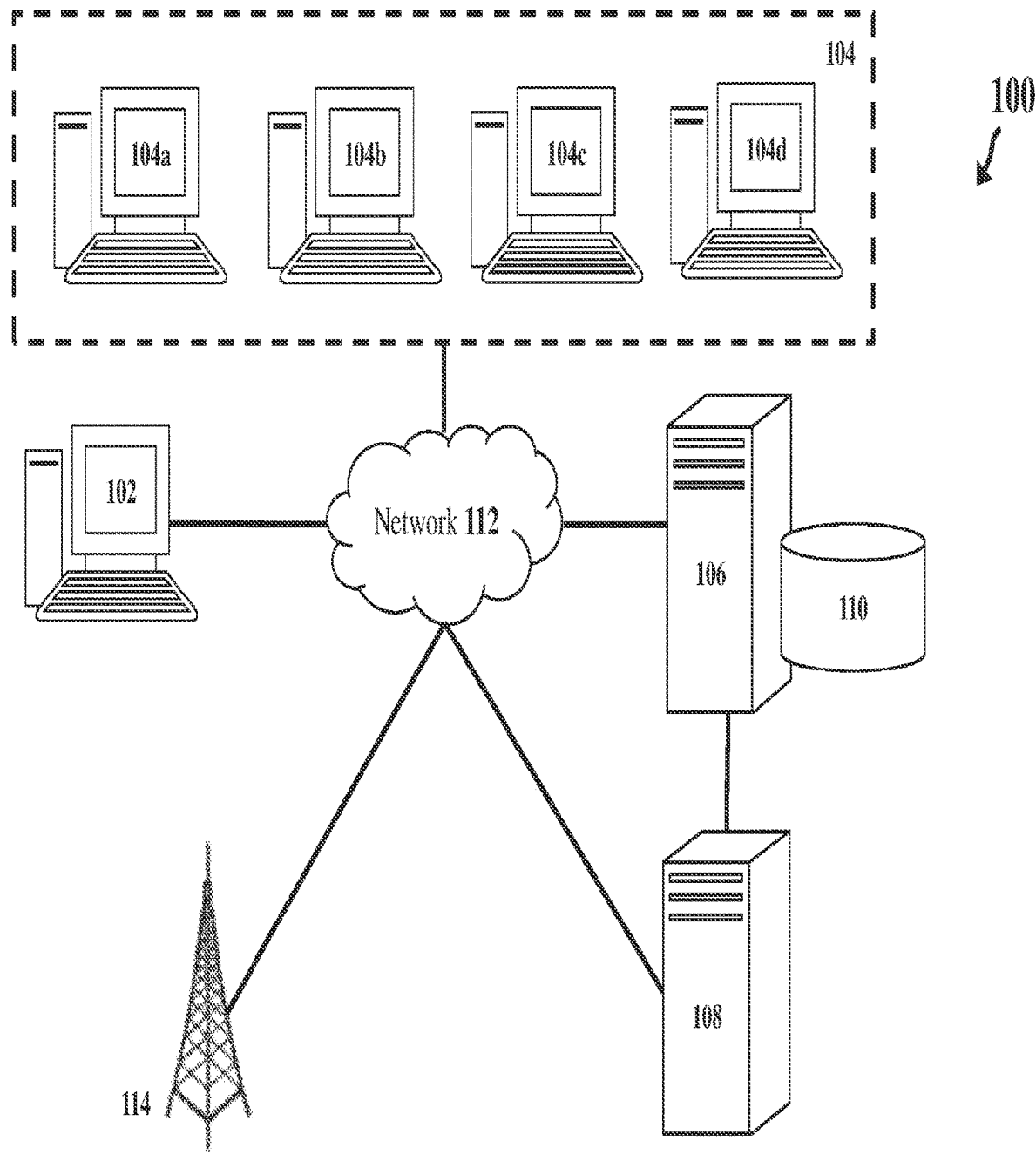
FIG. 1 shows components of a system for authenticating users, according to an embodiment.

The present disclosure described herein reference potential embodiments illustrated in the drawings. Other embodiments or changes to embodiments may be used, made, or described herein, without departing from the spirit or scope of the present disclosure. It should be appreciated that the illustrative embodiments described in the detailed description are not meant to be limiting of the subject matter presented here.

Reference made to the exemplary embodiments illustrated in the drawings, and the specific language used herein to describe the same, are not necessarily intended as limitations of the scope of this disclosure. Alterations and further modifications of the inventive features illustrated and described herein, and additional applications of the principles of the subject matter of the disclosure, occurring to one skilled in the relevant art and having possession of this disclosure, should be considered within the scope of the disclosure.

FIG. 1 illustrates components of a system 100 for authenticating users, according to an embodiment. The system 100 may include a user device 102, client devices 104, a system server 106, an authentication server 108, and a database 110. The user device 102, the client devices 104, the system server 106, the authentication server 108, and the database 110 may be connected to each other through a network 112.

The examples of the network 112 may include, but are not limited to, private or public LAN, WLAN, MAN, WAN, and the Internet. The network 112 may include both wired and wireless communications according to one or more standards and/or via one or more transport mediums. The communication over the network 112 may be performed in accordance with various communication protocols such as Transmission Control Protocol and Internet Protocol (TCP/IP), User Datagram Protocol (UDP), and IEEE communication protocols. In one example, the network 112 may include wireless communications according to Bluetooth specification sets, or another standard or proprietary wireless communication protocol. In another example, the network 112 may also include communications over a cellular network, including, e.g. a GSM (Global System for Mobile Communications), CDMA (Code Division Multiple Access), EDGE (Enhanced Data for Global Evolution) network.

Server Devices

A system server 106 may comprise various hardware and software components that may receive data from and transmit data to the user device 102 through the network 112. The data received from the user device 102 may include a request to open a new account and/or request to perform a transaction on an existing account with a company associated to the system server 106. The hardware and software components of the system server 106 may further receive data from and transmit data to the authentication server 108 through the network 112. The system server 106 may store the received request and/or data contained in the request from the user device 102 in the database 110 and subsequently retrieve data stored in the database 110 for processing any requests. The system server 106 may perform various operations on the data retrieved from the database 110 and on data received from the user device 102 and/or the authentication server 108.

A system server 106 may be any computing device comprising non-transitory machine-readable storage media and a processor capable of executing the various processes and tasks described herein. Non-limiting examples of the system server 106 may include a server computer, a desktop, a laptop, a tablet, or the like. In some cases, the system server 106 may be coupled to the database 110 of the system 100, and, in other cases, the system server 106 may host the database 110. For ease of explanation, FIG. 1 shows a single computing device functioning as the system server 106. However, some configurations may comprise any number of computing devices capable of performing the various tasks described herein.

A system server 106 may host an application server or a webserver, either of which may include software modules allowing a user of the user device 102 to access a company webpage hosted by the system server 106. Users may access the company webpage hosted on the system server 106 directly over the network 112 using the user device 102 to open an account and/or perform a transaction on an existing account. The system server 106 may include various modules for collecting the user information for account opening, for determining a rate for the account, for confirming the accuracy of the user, for tracking the progress of the account opening application, and for recording and organizing text entries by various administrators of the system server 106.

A system server 106 may provide user information and account information systems that may be accessed by a user operating the user device 102. Information for account opening may be submitted by the user in several ways to the system server 106. For instance, the user may enter personal and account information using the user device 102, which directly accesses data entry application on a webpage (for example, a webpage 202 shown in FIG. 2A) hosted by the system server 106 over the network 112. In some embodiments, a user may contact administrators of the system server 106 by telephone and provide user information that is entered into the data entry application and used to pre-fill (e.g., pre-populated) an account opening application. For instance, the webpage discussed in FIG. 2 may be pre-populated with some user information.

In some embodiments, a data entry application hosted by the system server 106 may prompt the user with a plurality of data input fields on a new user information web page that are each labeled with the type of information desired for entry. While the information requested by the system server 106 may vary depending upon the account application, the data input fields may be configured to receive such data as: a first and last name of the user, date of birth, tax identification number, social security number, an address, including city, state and zip code, telephone number, facsimile number, e-mail address, mother's maiden name and place of birth, and/or details of one or more users/users registered with the company that can vouch and/or verify the user (for example, personal details of cohabitant 204 shown in FIG. 2B).

Once the user has entered the information on the data entry application hosted by the system server 106, the user information may be stored in the database 110 by the system server 106. Different types or amounts of information may be requested from the user by the system server 106 depending upon the minimum needs for the type of account and the company.

A system server 106 may be configured to review the user information in real time as it is inputted and to validate the user information using a predetermined set of rules. The rules may include edits of certain data-entry fields to ensure proper formatting of the user information as it is entered. For instance, the system server 106 may refuse to accept a social security number entry that does not include nine digits. Other verification method executed by the system server 106 includes matching the zip code to the city listed in the address information. Additionally, the system server 106 may verify that the user entered information in selected fields required to open the account. In some embodiments, the required information may include a customer name, social security number, physical address, birth date, and vouching user/user details including but not limited to a relationship between the user and vouching user, name of the vouching user, account number of the vouching user, date of birth of the vouching user, and gender information of the vouching user. Such required information, however, may be varied by the system server 106 depending upon the company's needs or regulations applying to the type of account being opened by the user.

In some embodiments, a vouching user cited in a request from a new user for opening an account with a company may be a registered user of the company associated with a system server 106. Upon receiving details regarding the vouching user (e.g., name, address, and account number of the vouching user) submitted by the user in the account opening data entry application, the system server 106 may obtain a reputation score of the vouching user. In some embodiments, a reputation score for each of the existing users of the company may already be generated by the system server 106 and/or the authentication server 108 and stored in the database 110.

The system server 106 may generate a request to receive the reputation score of the vouching user, and transmit the request to the authentication server 108 and/or the database 110. The authentication server 108 and/or the database 110, upon receiving the request from the system server 106, may retrieve record of the vouching user, and then transmit the reputation score of the vouching user to the system server 106. In some instances, the authentication server 108 and/or the database 110 transmit additional data such as fraud indicators associated to the vouching user along with the reputation score of the vouching user to the system server 106.

In some embodiments, a system server 106 may generate a reputation score of a vouching user using a reputation scoring application upon receiving a request from a new user citing the vouching user to vouch for the new user in order to facilitate authentication of the new user. The system server 106 may generate a reputation score of the vouching user based on data the vouching user provide about themselves (such as identification details of the vouching user, transaction record of the vouching user, and online activity of the vouching user), based on social and financial activity of the vouching user, and based on activity of other users, for example, by having other users declare that they trust the vouching user.

A system server 106 obtains data records corresponding to the vouching user from the database 110 to generate the reputation score of the vouching user. The data records may be used as an input for the reputation scoring application executed by the system server 106 to calculate the reputation score of the vouching user. The reputation scoring application executed by the system server 106 may include non-linear statistical data models such as neural networks, decision trees, Bayesian networks, genetic algorithms, and several other types of non-linear statistical data models. In some embodiments, a non-linear statistical data model used by the reputation scoring application executed by the system server 106 may be a neural network. Neural networks have numerous applications, such as being used to determine users reputation scores based on information about the users, such as number of accounts, banking cards, late payments, income, etc.

A system server 106 may generate a reputation score to measure trustworthiness of the vouching user based at least in part on the user interactions (such as online interaction, banking transactions, social interactions etc.) associated with the user. In some instances, the more the user engages in user interactions in appropriate ways, the more trustworthy the user tends to be and the higher the reputation score is or lower if a lower score indicates a more trustworthy person. The reputation scoring application executed by the system server 106 processes the user activity data from the data records to identify user interactions associated with a vouching user, categorizes the vouching user interactions, determines base scores and weights for each type of vouching user interaction included in each category, and computes a reputation score for the vouching user.

In a non-limiting example, the system server 106 may identify a subset of the existing users where each existing user within the subset of the existing user satisfies a reputation score threshold. The system server 106 may then request each user within the subset of the existing user to vouch for a new user.

In some embodiments, data records corresponding to the vouching user used as an input for the reputation scoring application executed by the system server 106 may include, but not limited to, a length of account membership of the vouching user with the company, share of relationship of the vouching user with the company, product acquisition history of the vouching user with the company (for example type of products owned by the vouching user), all activity of the vouching user, profile details of the vouching user (for example, a government official, a celebrity), financial indicators such as types of accounts, account balance, credit score, and alert elements corresponding to vouching user (any known flag for activity or known fraud).

In some embodiments, data records corresponding to the vouching user used as an input for the reputation scoring application executed by the system server 106 may include, but not limited to, results of assessment of the vouching user based on social media accounts of the vouching user, and number and types of relationships of the vouching user known to the company such as family members, company employees, military relationships, employment related relationships, social and financial relationships.

To calculate the reputation score for the vouching user, the system server 106 may first generate a social score that incorporates social affinity between the vouching user and persons having relationship to the vouching user. A social scoring application of the system server 106 receives vouching user interaction data associated with known trustworthy and untrustworthy persons, and applies machine learning or logistic regression to generate a learning result that includes additional vouching user interactions, their associated base scores and weights. The social scoring application of the system server 106 then uses calculated social score of the vouching user as one of the inputs to calculate a reputation score of the vouching user, and may further update the reputation score of the vouching user based on the learning result.

In some embodiments, data records corresponding to the vouching user used as an input for the reputation scoring application executed by the system server 106 may include, but not limited to, details of any previous vouching by the vouching user and/or reputation score for previous users vouched by the vouching user. Based on the data records, a system server 106 generate a reputation score for the vouching user, and store the reputation score in the database 110. In some embodiments, based on new data records of the vouching user, a system server 106 may update a reputation score for the vouching user stored in the database 110. In some embodiments, based on new and updated data records of the vouching user, the system server 106 may periodically update a reputation score for the vouching user stored in the database 110.

A system server 106 may further determine a minimum reputation score required by the vouching user to vouch for any new user. The minimum reputation score required by registered users to vouch for any new user may be stored in the database 110. In some embodiments, a minimum reputation score required by each registered user to vouch for any new user may be same. In some embodiments, a minimum reputation score required by each registered user to vouch for any new user may be different from one another, and stored in a record of a registered user in the database 110. Upon determining the minimum reputation score required by the vouching user from the record of the vouching user in the database 110 to be eligible to vouch for the new user, the system server 106 then compares the generated and/or obtained reputation score of the vouching user from the database 110 with the minimum reputation score required by the vouching user to determine if the vouching user is eligible to vouch for the new user.

When the new user is found to be eligible to vouch for the new user based on having a reputation score that exceeds the minimum reputation score, the system server 106 may transmit a request to the authentication server 108 to communicate with the vouching user regarding a request received by the new user requesting the vouching user to vouch for the new user. In some embodiments, the authentication server 108 upon receiving the request from the system server 106 may communicate with the vouching users on the client devices 104 of one or more vouching users. In some embodiments, the authentication server 108 upon receiving the request from the system server 106 may first verify a relationship between the vouching user and the new user, and then communicate with the vouching user on their client devices 104 to vouch for the new user.

An authentication server 108 may be configured to verify identity of a new user, and a relationship between a vouching user and a new user based on analysis of data regarding the vouching user and the new user obtained from an internal database 110 and external sources. The data obtained regarding the vouching user and the new user from the database 110 and external sources may include but not limited to social media data and/or location data of the new user and the vouching user.

In some embodiments, an authentication server 108 may crawl through various databases and collect social network information of the vouching user and the new user that is publicly available from various social networks, which host a variety of data related to the vouching user and the new user. Depending on configurations of the social networks and characteristics of the vouching user and the new user, the vouching user and the new user may be required to authenticate on the social networks or otherwise give permission to the social networks in order for the authentication server 108 to have access to and capture relevant data from their social network profiles. The authentication server 108 then harvests the social network information of the vouching user and the new user from these social networks via automated visits to publicly available web pages of the social networks, or via public and private APIs provided for data access to the social networks.

Once the social network information of the vouching user and the new user is captured from the social networks via the authentication server 108, the authentication server 108 stores the collected data in the database 110. The authentication server 108 may then verify the validity of the vouching user, the new user identity and trustworthiness, based upon data from the social networks of the vouching user and the new user, and profile information of the vouching user and the new user stored in the database 110, which is created and maintained by the system server 106. If the vouching user and the new user identity and relationship is verified and approved, the authentication server 108 automatically proceeds to communicate with the vouching user to vouch for the new user as requested by the new user. Otherwise, the authentication server 108 may request the system server 106 to obtain additional information from the vouching user and/or the new user and/or provide relevant information to an administrator of the system 100 to review and make further decisions. In some embodiments, when requested, the authentication server 108 may provide the social network information of the vouching user and the new user to the system server 106 for verifying the identify and relationship of the vouching user and the new user.

In some embodiments, an authentication server 108 may use location data of personal devices (client devices 104 and user device 102) used by the vouching user and the new user to verify both identify and/or the relationship between the vouching user and the new user. The authentication server 108 may determine location and/or IP address of one or more client devices 104 and the user device 102, then determine proximity between the one or more client devices 104 and the user device 102, and further match the IP address of the one or more client devices 104 and the user device 102. Based on the proximity and/or IP address of the one or more client devices 104 and the user device 102, the authentication server 108 may determine whether the client devices 104 and the user device 102 belongs to a same person or related persons. If the vouching user and the new user identity is verified and approved based on location and/or IP address of the devices (the client devices 104 and the user device 102) of the vouching user and the new user, the authentication server 108 automatically proceeds to communicate with a vouching user to vouch for the new user as requested by the new user. Otherwise, the authentication server 108 may request the system server 106 to obtain additional information from the vouching user and/or the new user and/or provide relevant information to an administrator of the system 100 to review and make further decisions.

The above-mentioned example allows the system server 106 to identify a relationship between a new user and one or more existing users. If the system server identifies a relationship between the new user with one or more existing or vouching users, the system server 106 may contact the one or more identified vouching users to authenticate the new user. For instance, the system server may query an identifier (e.g., GUID (global unique identifier), (MAC) media access control address, IP (internet protocol) address, phone number, and the like) associated with the user device 102. The system server 106 may then compare the identifier with a list of identifiers associated with existing users. If the system server 106 determines that the identifier associated with the user device 102 is associated with a known user, the system server 106 may notify the existing users and request the existing users to vouch for the new user.

For example, the system server 106 (or the authentication server 108) may determine that the user device 102 is connected to the network 112 via a similar IP address as the client device 104*d* (e.g., the IP address may share a prefix or the phone numbers may be the same). As a result, the system server 106 may transmit an electronic notification to the client device 104*d* and verify the user 102.

The authentication server 108 may be configured to communicate with a vouching user operating one or more client devices 104. The communication from the authentication server 108 may be regarding a request (for e.g. new account membership request) received from a new user. The request may include details provided by the new user regarding a relationship between the vouching user and the new user. In some embodiments, the authentication server 108 may determine a method of communicating to the vouching user on one or more client devices 104 regarding the request received from the new user based on the vouching user preferred mode of communication stored in a vouching user record in the database 110. In some embodiments, the authentication server 108 may determine a method of communicating to the vouching user on one or more client devices 104 regarding the request received from the new user based on contact information of the vouching user stored in a vouching user record in the database 110 when there is no preferred mode of communication mentioned by the vouching user. In some embodiments, the authentication server 108 may determine a method of communicating to the vouching user regarding the vouching request received from the new user based on a channel of vouching initiation decided by an administrator of the system 100.

In some embodiments, one method of communication by an authentication server 108 to a vouching user on one or more client devices 104 may include a three-way push technique. The three way push technique executed by the authentication server 108 to authenticate the new user by the vouching user may include transmitting a text message or push notification to the client devices 104 of the vouching user a token/code that may be digitally signed and shared between both the vouching user and the new user on the user device 102. The one or more client devices 104 and/or the user device 102 then transmit back a digitally signed token/code back to the authentication server 108 to confirm that their on record phone numbers are in possession of the vouching user and the new user.

In some embodiments, an authentication server 108 may communicate to a vouching user on one or more client devices 104 to authenticate the new user by transmitting an alert push notification to the vouching user via phone or email stored in a record of the vouching user in the database 110 to approve or deny relationship and information about the new user. In some embodiments, an authentication server 108 may communicate to a vouching user on one or more client devices 104 to authenticate the new user by transmitting a notification/alert on the one or more client devices 104 requesting the vouching user to access a relationship verification widget within a digital application hosted on the system server 106 and/or the authentication server 108 to verify relationship and information about the new user. The vouching user may be required to login the digital application hosted on the system server 106 and/or the authentication server 108 to verify the relationship and information about the new user.

In some embodiments, an authentication server 108 may communicate to a vouching user on one or more client devices 104 to authenticate the new user by transmitting a notification/alert to both the one or more client devices 104 and/or the user device 102 requesting to initiate calls to a phone center of a company to confirm their relationship. In some embodiments, an authentication server 108 may communicate to a vouching user on one or more client devices 104 to authenticate the new user by initiating a call to the vouching user on one or more client devices 104 to confirm the relationship and information about the new user.

In some configurations, the system server 106 or the authentication server 108 may create a unique digital identity for each existing user. For instance, the server 106 record each existing user's electronic activity on each client device 104. The digital identify may comprise any activity or transaction performed by the existing user. For example, a user's online navigation pattern may serve as the user's digital identity. For instance, the system 106 may periodically retrieve cookies from an internet browser of the client device 104 and update the user's digital identity accordingly. In some configurations, the system server 106 may include browsing time, duration, website categories visited, and other similar attributes in each existing user's digital identity profile.

The system server 106 or the authentication server 108 may use the above-mentioned digital identity to authenticate an existing user when the existing user has trouble with logging in to the network. For example, instead of the traditional "forgot my password" prompt, the authentication server 108 may query the user's digital identity form the database 110 and compare to the digital identity of an electronic device purporting to be operated by the existing user (for example by querying a communication service provider 114 or directly querying the electronic device). If the two digital identities match, the authentication server may authenticate the electronic device and grant the electronic device access to the existing user account. Although this example is described as using the digital identity of an existing user as a standalone authentication method, the authentication server 108 and the system server 106 may combine the above-mentioned method with other methods described herein. For instance, in addition to contacting the vouching users, the authentication server 108 may also authenticate a user using his/her digital identity. In some configurations, the vouching methods described herein may be used to authenticate an existing user.

Computing Devices

A user device 102 may communicate with an application provider such as a system server 106 through a network 112. The user device 102 may be configured to communicate with the system server 106 to use one or more applications services (banking and/or insurance services) provided by the system server 106. The user device 102 may include a desktop personal computer, workstation, laptop, PDA, smart phone, cell phone, or any WAP-enabled device or any other computing device capable of interfacing directly or indirectly with the network 112. The user device 102 may run an HTTP client, e.g., a browsing program, such as internet explorer or other browser, or a WAP-enabled browser in the case of a cell phone, PDA or other wireless device, or the like. The user device 102 may be implemented using a general purpose computing device such as the computing device.

In operation, a new user on the user device 102 may execute an Internet browser that accesses a webserver coupled to a system server 106 hosting a website that allows the new users to access their financial and/or other products. Using the user device 102, a new user may select a product on the company-centric website and submit an application to open an account. As the transaction proceeds, the user device 102 may be used by the new user to upload machine-readable computer files (e.g., PDF, DOC, XSL) containing information required to open the account. The computer files received by the system server 106 may be stored into document records of a new user in the database 110.

The client devices 104 may be any computing and/or telecommunications device comprising a processor and capable of performing the various tasks and processes described herein, such as accessing a system server 106 and providing a GUI interface to a registered user/user of a company to interact with a client-centric web site hosted on the system server 106. Non-limiting examples of the client devices 104 may include a telephone (e.g., POTS landline telephone, cellular telephone, smartphone), a client computer (e.g., desktop, laptop, server, tablet), or any other telecommunications or computing device used to communicate with company services.

In some embodiments, the client devices 104 may be any computing device allowing a user/client of a company to interact with the system server 106. The client devices 104 may execute an Internet browser or local application that access a webserver in order to issue requests or instructions to the system server 106 to access the system 100. The client devices 104 may transmit credentials from user inputs to the system server 106, from which the system server 106 may authenticate the user and determine a user role. One having skill in the art would appreciate that the client devices 104 may comprise any number of input devices configured to receive any number of data inputs (e.g., mouse, keyboard, touchscreen, stylus), including various types of data inputs allowing for authentication, e.g., username, passwords, certificates, biometrics. One having skill in the art would also appreciate that the client devices 104 may be any computing device comprising a processor and non-transitory machine-readable storage medium allowing the client devices 104 to perform the various tasks and processes described herein.

As an example of the client devices 104 operation, a user operating the client devices 104 may execute an Internet browser that accesses a webserver coupled to a system server 106 hosting a website that allows the users to access their financial and/or other accounts. Using the client devices 104, a user may select a product on the company-centric website. As the transaction proceeds, the client devices 104 may be used to upload machine-readable computer files (e.g., PDF, DOC, XSL) containing transaction information. The computer files received by the system server 106 may be stored into document records of a user in the database 110. The client devices 104 may also be used to issue queries or instructions to the system server 106 via the webpages generated by the webserver coupled to the system server 106, which then instruct the system server 106 to perform various tasks, such as retrieving or updating a file from the database 110.

Database

A database 110 may be hosted on any server such as a system server 106 and is capable of storing personal data, account information data, social media data, and/or reputation score that is associated with registered users of a company. The database 110 may be in communication with a processor of the system server 106, where the processor is capable of executing the various commands of the system 100. In some embodiments, the database 110 may be part of the system server 106. In some embodiments, the database 110 may be a separate component in communication with the system server 106.

The database 110 may also be in communication with other components of the system 100 via the network 112 and include a non-transitory machine-readable storage media capable of receiving, storing, updating all data and/or reputation score corresponding to registered users in the database 110. In some embodiments, the database 110 may be capable to administer, track, and provide reports on data in one or more documents stored in a record of each user. The database 110 may be structured to include some or all of the following information such as a document identifier (e.g., a title), a document location (e.g., a path and filename), a document type (e.g., statement), a product unit (e.g., insurance, banking), and tracking data (e.g., creation date, last modified date).

The database 110 may be implemented as a relational database, a centralized database, a distributed database, an object oriented database, or a flat database in various embodiments, and may have a logical construct of data files that are stored in non-transitory machine-readable storage media, such as a hard disk or memory, controlled by software modules of a database program (for example, SQL) that executes the code modules (for example, SQL scripts) for various data queries and other management functions generated by the system server 106.

In some embodiments, a memory of the database 110 may be a non-volatile storage device for storing registered users/users data and instructions, to be used by a processor of the system server 106. The memory may be implemented with a magnetic disk drive, an optical disk drive, a solid-state device, or an attachment to network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, a memory of the database 110 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable memories (EEPROM) memories.

In some embodiments, the database 110 may be a graph database. A graph database is a database that uses graph structure for semantic and other queries with nodes, edges, and properties to represent and store data. A key concept of the system is the graph (or edge or relationship), which directly relates data within the database. The above-mentioned relationships allow data stored in the database 110 to be linked together directly, and in many cases retrieved with one operation. Utilizing graph database technology, the system server 106 may be able to retrieve user data faster and more efficiently, which may lead to faster and/or more efficient (e.g., using less computing power) user authentication.

Figure 3:
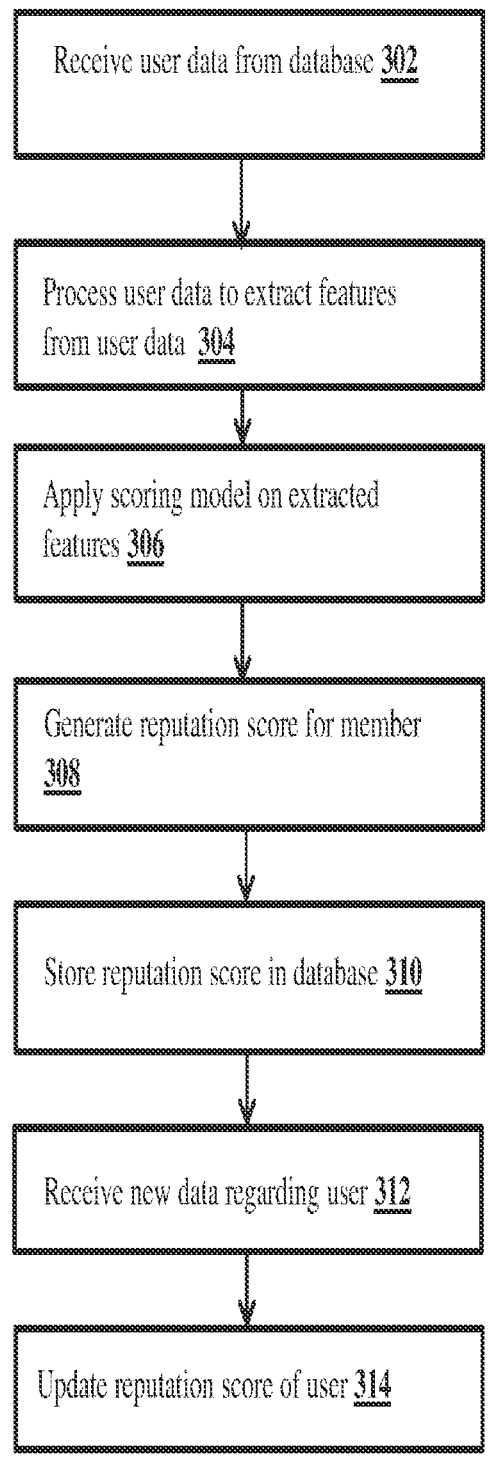
FIG. 3 shows execution of a method for generating a reputation score, according to an embodiment.

FIG. 3 shows execution steps for generating a reputation score, according to a method 300. The method 300 shown in FIG. 3 comprises execution steps 302, 304, 306, 308, 310, 312, and 314. However, other embodiments may comprise additional or alternative execution steps, or may omit one or more steps altogether. Other embodiments may perform certain execution steps in a different order; steps may also be performed simultaneously or near-simultaneously with one another. In addition, the method 300 of FIG. 3 is described as being executed by a single server computer, referred to as a server in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the server described herein.

In a first step 302, a server retrieves a user/member data from an internal database. In some embodiments, a server generates a request and transmits the request to the internal database to obtain the data associated to a particular user. The internal database upon receiving the request transmits the user data to the server. The user data stored in the internal database may include, but not limited to, a first and last name of the user, date of birth, tax identification number, social security number, an address, including city, state and zip code, telephone number, facsimile number, e-mail address, mother's maiden name and place of birth, a length of account membership of the user with a company, share of relationship of the user with the company, product acquisition history of the user with the company (for example type of products owned by the user), all transactional and account activity of the user, profile details of the user (for example, a government official, a celebrity), financial indicators such as types of accounts of the user, account balance of the user, credit score of the user, and alert elements corresponding to user (any known flag for activity or known fraud).

In some embodiments, a server retrieves a user/member data from the internal database and/or an external database. The user data in the internal database and/or the external database may include, but not limited to, results of assessment of the user based on social media accounts of the user, and number and types of relationships of the user known to the company such as family members, company employees, military relationships, employment related relationships, and social and financial relationships. In some embodiments, the user data may further include, but not limited to, details of any previous vouching by the user and/or trust score for previous users vouched by the user.

In a next step 304, a server processes the user data received from the databases to extract features from the data that are used to calculate a reputation score. The server may extract one or more features from the data based on a pre-determined list of features. In one embodiment, the pre-determined list of features may be associated to type of account of the user, user's location, financial attributes associated with the use, and the like. In another embodiment, the pre-determined list of features may be associated to a risk score of the user. The server processes all the data related to the user, and extract the one or more features from the data based on the pre-determined list of features applicable to the user.

In a next step 306, a server executes a scoring model application using extracted features to generate a reputation score for the user. The server may initially determine a base score for each type of data feature extracted from the user data. In some instances, the server may normalize the base scores according to a scale. The server then determines a weight for each type of data feature extracted from the user data. A server then generates a reputation score for the user by combining the base scores and the weights using a scoring application function, at step 308.

In a next step 310, a server stores a reputation score of a user in a user record within a database. The server may use the generated reputation score for analysis and/or to provide to other servers and/or computing devices of a system upon request.

In a next step 312, a server may receive a notification regarding new data being uploaded about the user in the database. In some embodiments, the server may periodically check the data record of the user to identify any new data stored about the user in the data record. Upon identifying the new data regarding the user, the server then retrieves the new data and extract features that are essential from the new data to calculate a new reputation score of the user based on the new data features. The server again determines a base score and a weight for each type of new data feature extracted from the user data. A server then generates an updated reputation score for the user by combining the base scores and the weights for each type of new data feature using a scoring application function, at step 314. The server stores the updated reputation score of the user in the user record within the database.

Figure 4:
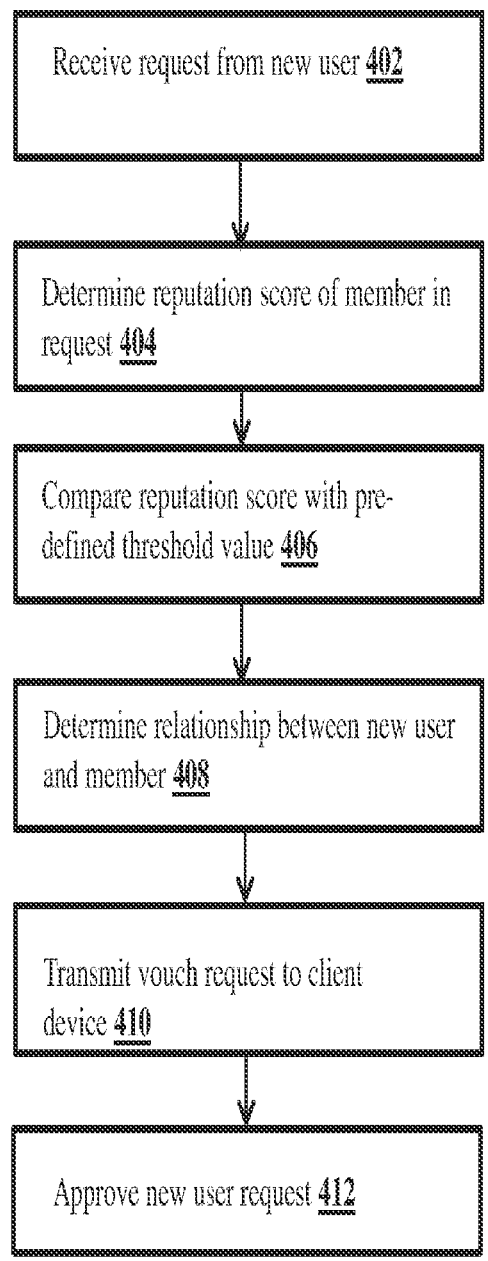
FIG. 4 shows execution of a method for authenticating users, according to an embodiment.

FIG. 4 shows execution steps for authenticating users, according to a method 400. The method 400 shown in FIG. 4 comprises execution steps 402, 404, 406, 408, 410, and 412. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 400 of FIG. 4 is described as being executed by a single server computer, referred to as a server in this embodiment. However, in some embodiments, steps may be executed by any number of computing devices operating in a distributed computing environment.

In some cases, a computer executing one or more steps may be programmed to execute various other, unrelated features, where such computer does not need to be operating strictly as the server described herein. As used herein, and through this disclosure, "member," "existing user," and "registered users" are used interchangeably. For example, the system server may query all existing users (e.g., members of the entity), determine a reputation score for each existing user, and request them to vouch for a new user.

In a first step 402, a user at a user device may interface with a data entry application hosted by a server, such as by using a web server, to sign-up for a service and/or an account with a company. The user may be presented with options, such as data and/or documents to provide using an interface provided by the web server. In an embodiment, the web server may provide a message to the user that indicate which documents to provide and a method of delivery of the documents. While the data requested by the server may vary depending upon the service and/or the account application, but may include, a first and last name of the user, date of birth, tax identification number, social security number, an address, including city, state and zip code, telephone number, facsimile number, e-mail address, mother's maiden name and place of birth, and/or details of a relationship with at least one account from a plurality of accounts corresponding to a plurality of existing users of the company.

In a next step 404, a server determines a reputation score corresponding to an existing user associated with the at least one account (e.g., the vouching user). In some embodiments, the server obtains the reputation score corresponding to the existing user associated to the at least one account from a record of the existing user stored in a database. In some embodiments, the server generate the reputation score of the user upon receiving the name of the existing user in the information obtained from the user signing up for a new service and/or account. In some embodiments, the server updates an already generated reputation score corresponding to the existing user associated to the at least one account based on any new information available about the user that has not been previously analyzed to calculate the reputation score.

In a next step 406, a server compares the most recent reputation score of the existing user with a pre-defined threshold value. In some embodiments, each existing user may have a same pre-defined threshold value. In some embodiments, each existing user may have a different pre-defined threshold value depending upon a risk value associated with the existing user. In such a case, a pre-defined threshold value associated to each existing user is stored within a profile of each existing user within the database. The server determines a predefined threshold value applicable to the existing user associated to the at least one account, and then compares the reputation score of the existing user with the predefined threshold value applicable to the existing user.

Upon the server determining that the reputation score corresponding to the existing user is greater than the applicable pre-defined threshold value, in a next step 408, a server verifies the identity of the user and the existing user associated to the at least one account identified by the user (e.g., vouching user). In some embodiments, the server may verify identify of the user and the vouching user based on determination of a logical address and a physical address of a user device being operated by the user and a client device operated the existing user. The logical address may comprise Internet Protocol (IP) address and/or globally unique identifier (GUID). GUID may be a unique reference number that may be used as an identifier of the user device and the client device. The value of a GUID may be presented as a 32-character hexadecimal string and is usually stored as a 128-bit integer. GUID may be used to distinguish hardware, software, networking, or a user, among others.

The server may determine the logical address and the physical address of the user device operated by the user based on one or more communication messages between the server and the user device. The one or more communication messages received by the server from the user device may include user inputs for signing up for the service and/or account. The server may determine the logical address and the physical address of the client device operated by the existing user based on one or more communication messages between the server and the client device. The one or more communication messages received by the server from the client device may include existing user inputs while performing online activity on the service and/or account hosted by the server. In some embodiments, the server may determine the physical address of the user device and the client device using one or more technologies such as global positioning system technology, Wi-Fi positioning technology, Bluetooth technology, and Radio Frequency signal technology.

In some embodiments, a server verifies a relationship between the user and the user based on social media data of the user and the existing user. In this case, the server may first select the social media data of the user and the existing user from a group consisting of social media profile, social media messages, social media activities, social media contact information, social media friend list, and social media events. Upon the selection of the social media data of both the user and the existing user, the server may then perform an analysis to determine an accuracy of relationship between the user and the existing user as indicated by the user and/or the existing user while signing up for the account and/or the service.

Upon the server determining that the logical address of the user device and client device are different to each other, and a distance between the physical address of the user device and the client device is greater than a pre-defined threshold value, in a next step 410, a server transmit to the client device of the existing user, a graphical user interface configured to display on the client device a message. The message may include data corresponding to an identity of the user, and data provided by the user regarding the existing user and the user relationship with user while signing up for the service and/or the account.

In a next step 412, a server may receive from a client device of an existing user, a message authenticating the user based at least in part on the confirmation of the identity of the user by the existing user operating the client device. In some embodiments, the existing user operating the client device may transmit a message to the server denying authentication of the user and/or requesting more details about the user prior to making a decision. Upon proper authentication, the server may grant, to the new user, access to the network and/or databases where the new user may create an account and request services to be fulfilled by one or more servers and/or databases coupled with the network.

In a non-limiting example, a new user may access an entity website where the user may interact with the website and transmit a request to be authenticated and/or a request to join a network of the entity. As part of the account creation process, the new user may provide personal information. For example, the new user provide previous employments, schools attended, and other identifying data. The new user may also provide one or more existing users (e.g., users having an existing relationship with the entity). As described above, the server may verify the existing users, identified by the new user, and determine a reputation score for each existing user. If the reputation score satisfies a threshold, the server may contact the existing users and prompt them to verify one or more attributes of the new user.

In another non-limiting example, the server may identify one or more potentially similar existing users and verify the new user's identity by transmitting verification messages to the potentially similar existing users, in a de-centralized manner. For instance, when the new user indicates that he has attended university A from 2014-2017, the server may retrieve a list of all existing users who attended university A during the same time period by querying a database configured to store existing user data. The server may then transmit a notification to each existing user who has attended the same university during the same time as the new user and request the existing users to verify the identity of the new user.

The server may transmit the verification notification to all the potentially similar existing users. However, in some embodiments, the server may only transmit the verification notification to a pre-determined number of existing users who satisfy a reputation score threshold. In another example, the server may determine that one or more existing users reside near an address provided by the new users. In those embodiments, the server may transmit a verification notification to the identified existing users and determine whether the existing users verify that the new user resides at the address provided.

In order to minimize the amount of administrative work and the computing power/resources consumed, the server may conduct a modular decentralized verification process. The server may verify the new user's identity by simultaneously transmitting messages to different users regarding different attributes of the new user. For instance, the server may generate a list of one or more existing users who may be able to verify the new user's first attribute (e.g., employment history). The server may also generate a second list of one or more existing users who may be able to verify the new user's second attribute (e.g., educational background). The server may then simultaneously transmit verification notifications to the existing users on the first and the second lists. The server may await a response from a predetermined quorum of network nodes (each computing device operated by each existing user on the first and the second list) to confirm the data is accurate. Once the pre-determined quorum or threshold has been met, the server may authenticate the new user.

In some configurations, the new user may be required to provide additional information to be verified by one or more existing users. In a non-limiting example, the server may prompt the new user to take a selfie image. The server may then transmit the image to the existing users within the first and/or the second list and request one or more existing users to verify whether the image indeed belongs to the new user.

Similar to the decentralized nature of the blockchain technology, the de-centralized nature of the above-mentioned authentication method allows the server to verify the new user's attributes in a more efficient manner than possible with human-intervention or conventional data-driven software solutions. Utilizing the above-mentioned decentralized verification mechanism is desired because it ensures that the server is not authenticating a new user based on obsolete data. Furthermore, this method is resistant to corruption because a possible cyber-attacker must simultaneously corrupt multiple existing accounts and their computing devices in order to falsely verify a new user's identity, which is considerably more difficult than corrupting a central database or attacking a central network. The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The invention claimed is:

1. A tangible, non-transitory computer-readable medium, comprising computer-readable instructions that, when executed by one or more processors, cause the one or more processors to:
   receive, via a request submitted via a graphical user interface (GUI) of a computer system, one or more attributes provided by a user of the computer system;
   receive an indication of an association between the user of the computer system and one or more registered users of the computer system other than the user of the computer system;
   in response to receiving the indication of the association, generate and provide an electronic vouch request to one or more electronic devices associated with at least a portion of the one or more registered users, the electronic vouch request prompting the at least portion of the one or more registered users to confirm at least a portion of the one or more attributes provided by the user;
   when a threshold number of responses to the electronic vouch request indicate confirmation of the one or more attributes, authenticate the request; and otherwise, refrain from authenticating the request.

2. The tangible, non-transitory computer-readable medium of claim 1, comprising computer-readable instructions that, when executed by the one or more processors, cause the one or more processors to:
   identify the at least portion of the one or more registered users based at least in part upon the at least portion of the one or more registered users having a reputation score meeting a threshold reputation score.

3. The tangible, non-transitory computer-readable medium of claim 1, comprising computer-readable instructions that, when executed by the one or more processors, cause the one or more processors to:
   define reputation scores of the portion of the one or more registered users.

4. The tangible, non-transitory computer-readable medium of claim 3, comprising computer-readable instructions that, when executed by the one or more processors, cause the one or more processors to:
   define reputation scores of the portion of the one or more registered users based at least in part upon previous vouching by the at least portion of the one or more registered users.

5. The tangible, non-transitory computer-readable medium of claim 3, wherein the reputation scores are based at least in part upon a length of time the portion of the one or more registered users have been registered with the computer system.

6. The tangible, non-transitory computer-readable medium of claim 1, comprising computer-readable instructions that, when executed by the one or more processors, cause the one or more processors to:
   identify the at least portion of the one or more registered users based at least in part upon the at least portion of the one or more registered users having a particular type of relationship with the user of the computer system.

7. The tangible, non-transitory computer-readable medium of claim 6, comprising computer-readable instructions that, when executed by the one or more processors, cause the one or more processors to:
   identify the at least portion of the one or more registered users based at least in part upon the at least portion of the one or more registered users having a particular length of relationship with the user of the computer system.

8. The tangible, non-transitory computer-readable medium of claim 7, comprising computer-readable instructions that, when executed by the one or more processors, cause the one or more processors to:
   identify the particular type of relationship and the particular length of relationship, by crawling social network data to identify data indicative of the particular type of relationship and the particular length of relationship.

9. The tangible, non-transitory computer-readable medium of claim 6, comprising computer-readable instructions that, when executed by the one or more processors, cause the one or more processors to:
   identify a distance between the one or more electronic devices associated with the at least portion of the one or more registered users and an electronic device of the user of the computer system;
   wherein the particular type of relationship comprises the one or more electronic devices associated with the at least portion of the one or more registered users being within a threshold distance of the electronic device of the user of the computer system.

10. The tangible, non-transitory computer-readable medium of claim 1, comprising computer-readable instructions that, when executed by the one or more processors, cause the one or more processors to:
    in response to providing the electronic vouch request to the one or more electronic devices associated with the at least portion of the one or more registered users, receive a request for additional information from at least one of the one or more electronic devices;
    in response to receiving the request for additional information, prompt, via an electronic device of the user of the computer system, for the additional information;

receive the additional information; and
provide the additional information to the at least one of the one or more electronic devices, enabling the at least one of the one or more electronic devices to receive the additional information to supplement the electronic vouch request.

11. The tangible, non-transitory computer-readable medium of claim 10, wherein the additional information comprises a selfie image of the user of the computer system.

12. The tangible, non-transitory computer-readable medium of claim 1, comprising computer-readable instructions that, when executed by the one or more processors, cause the one or more processors to:
receive, via the request submitted via a graphical user interface (GUI) of a computer system, an additional one or more attributes provided by the user of the computer system;
generate and provide a second electronic vouch request to an alternative one or more electronic devices associated with an alternative at least portion of the one or more registered users, the second electronic vouch request prompting the alternative at least portion of the one or more registered users to confirm the additional one or more attributes provided by the user;
when a threshold number of responses to the second electronic vouch request indicate confirmation of the additional one or more attributes, authenticate the request; and
otherwise, refrain from authenticating the request.

13. A computer-implemented method, comprising:
receiving, via a request submitted via a graphical user interface (GUI) of a computer system, one or more attributes provided by a user of the computer system;
receiving an indication of an association between the user of the computer system and one or more registered users of the computer system other than the user of the computer system;
in response to receiving the indication of the association, generating and providing an electronic vouch request to one or more electronic devices associated with at least a portion of the one or more registered users, the electronic vouch request prompting the at least portion of the one or more registered users to confirm at least a portion of the one or more attributes provided by the user;
when a threshold number of responses to the electronic vouch request indicate confirmation of the one or more attributes, authenticating the request; and
otherwise, refrain from authenticating the request.

14. The computer-implemented method of claim 13, comprising:
identifying the at least portion of the one or more registered users based at least in part upon the at least portion of the one or more registered users having a reputation score meeting a threshold reputation score.

15. The computer-implemented method of claim 13, comprising:
defining reputation scores of the portion of the one or more registered users based at least in part upon: a length of time the at least portion of the one or more registered users have been registered with the computer system, previous vouching by the at least portion of the one or more registered users, or both.

16. The computer-implemented method of claim 13, comprising:
identifying the at least portion of the one or more registered users based at least in part upon:
the at least portion of the one or more registered users having a particular type of relationship with the user of the computer system,
the at least portion of the one or more registered users having a particular length of relationship with the user of the computer system, or
both.

17. The computer-implemented method of claim 16, comprising:
identifying the particular type of relationship and the particular length of relationship, by crawling social network data to identify data indicative of the particular type of relationship and the particular length of relationship.

18. The computer-implemented method of claim 16, comprising:
identifying a distance between the one or more electronic devices associated with the at least portion of the one or more registered users and an electronic device of the user of the computer system;
wherein the particular type of relationship comprises the one or more electronic devices associated with the at least portion of the one or more registered users being within a threshold distance of the electronic device of the user of the computer system.

19. The computer-implemented method of claim 13, comprising:
in response to providing the electronic vouch request to the one or more electronic devices associated with the at least portion of the one or more registered users, receiving a request for additional information from at least one of the one or more electronic devices;
in response to receiving the request for additional information, prompting, via an electronic device of the user of the computer system, for the additional information;
receiving the additional information; and
providing the additional information to the at least one of the one or more electronic devices, enabling the at least one of the one or more electronic devices to receive the additional information to supplement the electronic vouch request.

20. The computer-implemented method of claim 13, comprising:
performing a three-way push, by:
providing, to the one or more electronic devices, a token or code electronically via a push notification or text message, wherein the token or code is digitally signed and shared between the one or more electronic devices and an electronic device of the user of the computer system;
in response to providing the token or code, receiving, from the one or more electronic devices, the electronic device of the user, or both, a second token or code, confirming that the one or more electronic devices are in possession of the at least portion of the one or more registered users, the electronic device of the user of the computer system is in possession of the user of the computer system, or both.

* * * * *